United States Patent

[11] 3,610,491

| [72] | Inventor | John A. Bott<br>931 Lake Shore Drive, Groose Pointe Shores, Mich. 48236 |
|---|---|---|
| [21] | Appl. No. | 29,867 |
| [22] | Filed | Apr. 20, 1970 |
| [45] | Patented | Oct. 5, 1971 |

[54] AUTOMOBILE SKI AND LUGGAGE RACK
24 Claims, 10 Drawing Figs.

[52] U.S. Cl. .................................................. 224/29 R, 224/42.1 E
[51] Int. Cl. ........................................................ B60r 9/00
[50] Field of Search............................................ 224/29 R, 42.01, 42.1 E; 214/450

[56] References Cited
UNITED STATES PATENTS

| 3,371,831 | 3/1968 | Schaeffer..................... | 224/42.1 E |
| 3,468,460 | 9/1969 | Wright et al.................. | 224/42.01 X |

FOREIGN PATENTS

| 1,008,873 | 2/1952 | France ........................... | 224/42.1 E |

*Primary Examiner*—Gerald M. Forlenza
*Assistant Examiner*—John Mannix
*Attorney*—Harness, Dickey & Pierce ABSTRACT: There is herein disclosed a combination ski rack and luggage rack adapted to be mounted on a trunk lid of an automobile by variably positionable hinge means and being movable between a flat stowed luggage carrying position and an inclined ski carrying position.

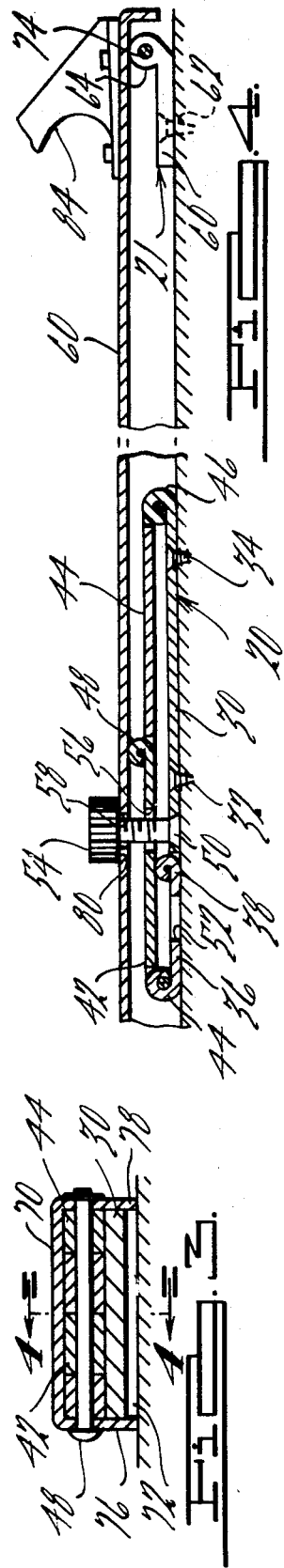
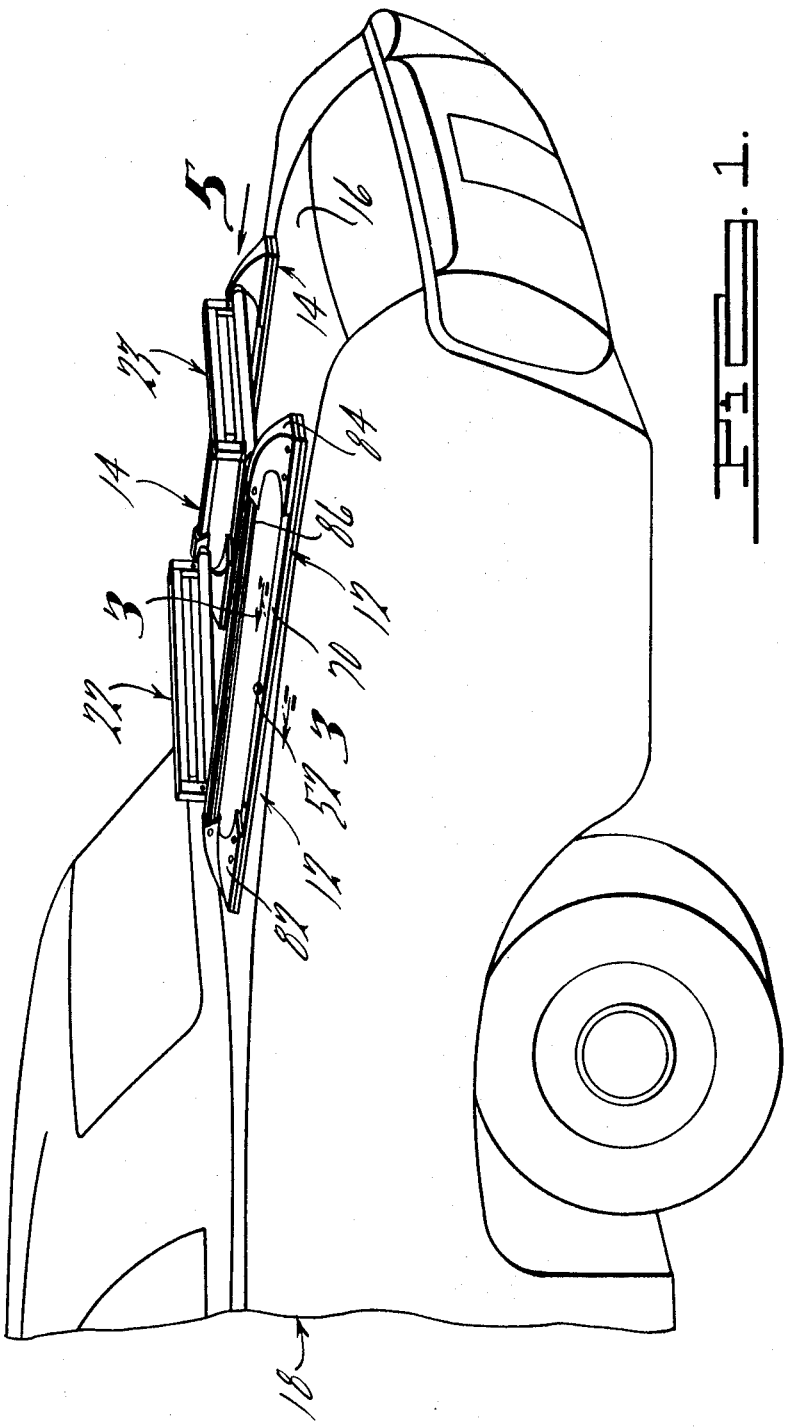

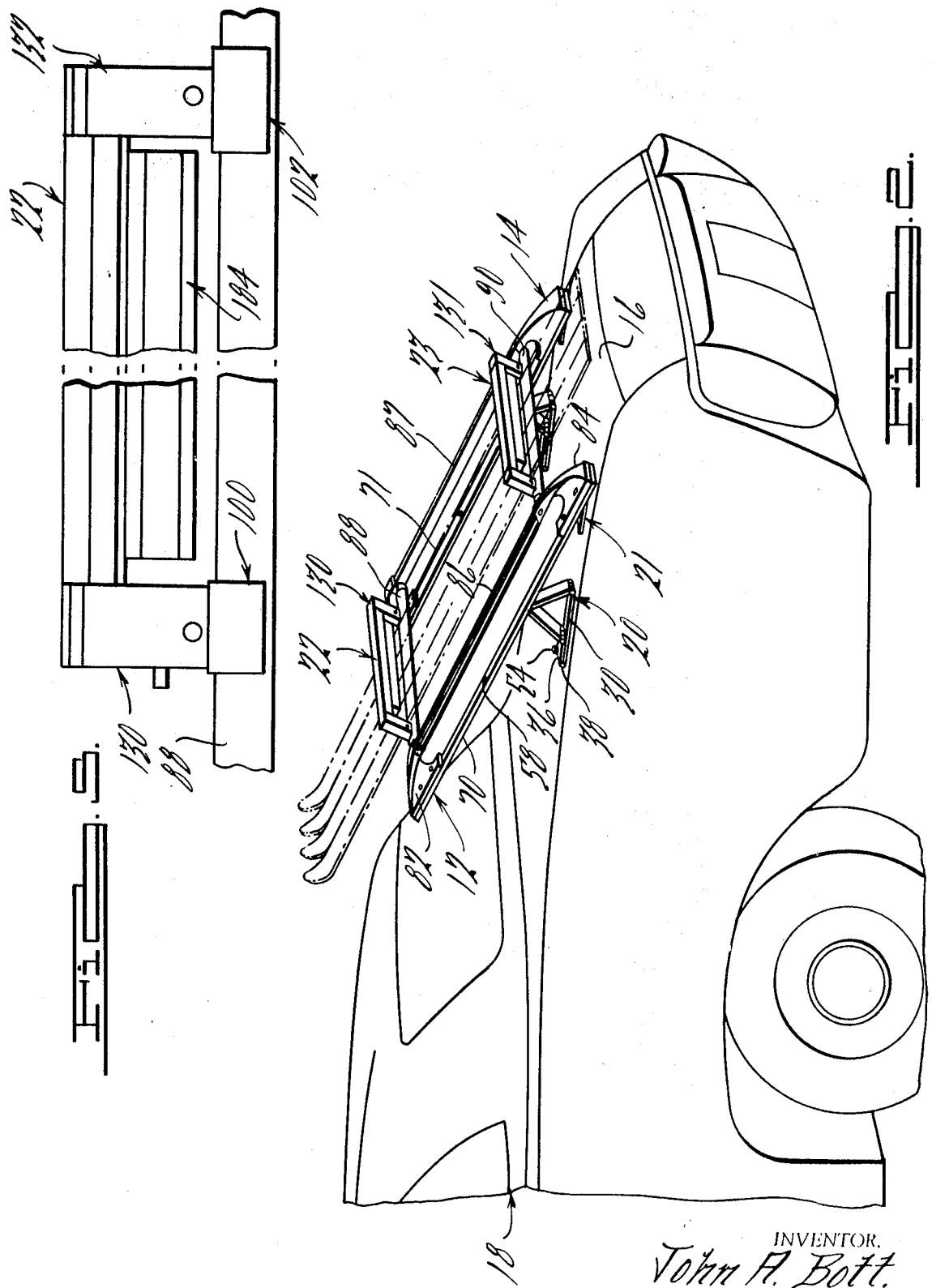

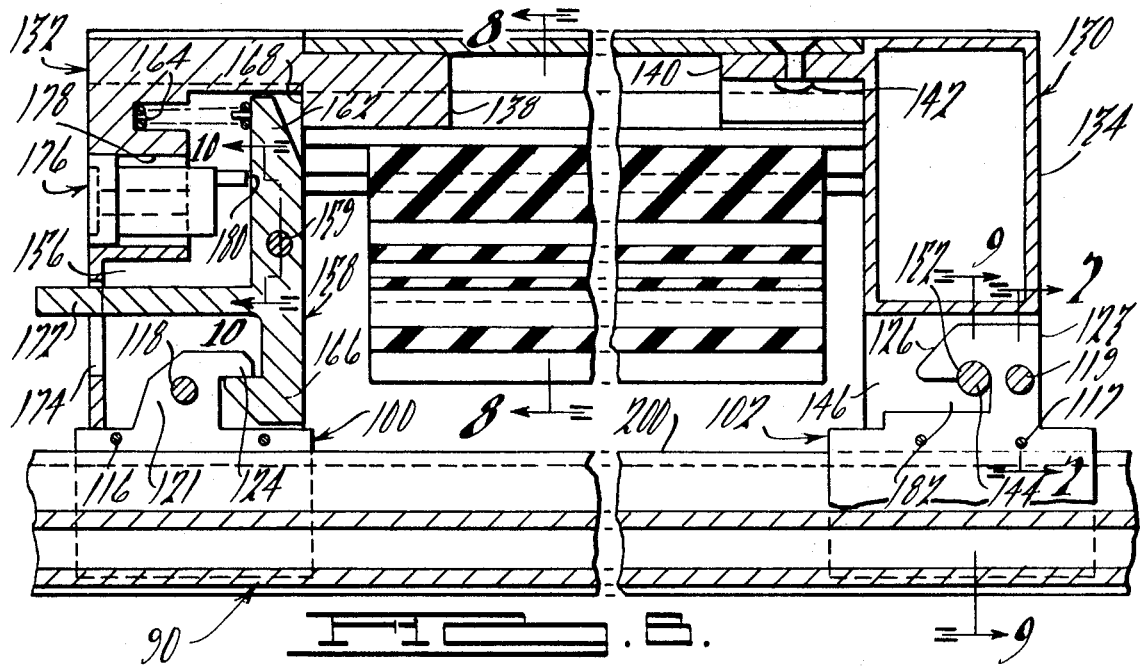
FIG. 6.
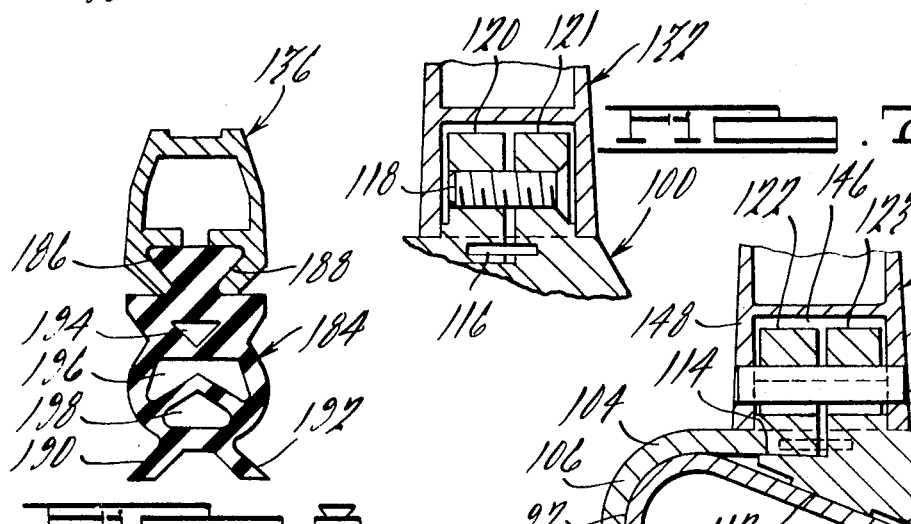
FIG. 7.
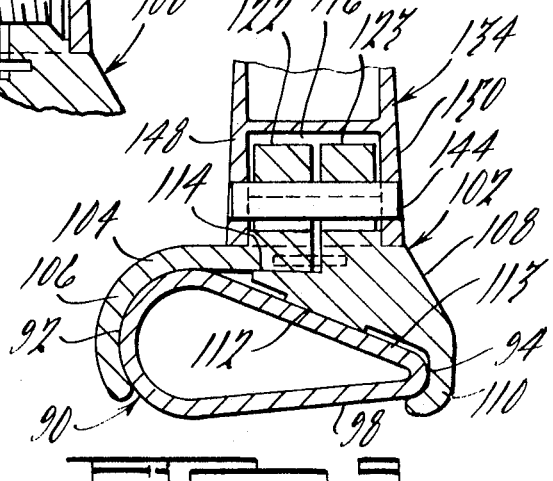
FIG. 8.
FIG. 9.
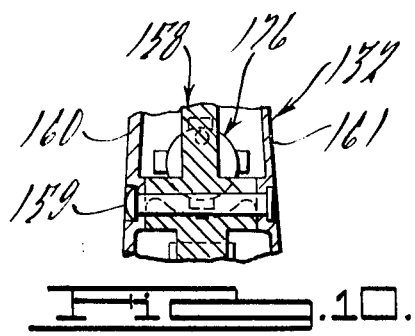
FIG. 10.
INVENTOR.
John A. Bott
BY
Harness, Dickey & Pierce
ATTORNEYS

3,610,491

AUTOMOBILE SKI AND LUGGAGE RACK

BACKGROUND AND SUMMARY OF INVENTIVE CONCEPTS

This invention relates to ski racks and the like of the general type disclosed in U.S. Pat. No. 3,333,750. The purpose of the present invention is to provide a combination ski rack and luggage rack which is movable between a flat stowed luggage carrying position and a raised inclined ski carrying position.

The rack comprises side and crossrail means enclosing a luggage carrying space and mounted on the vehicle by hinge means to enable movement of the rack to the raised inclined ski carrying position. Holding means are provided to secure the rack in the different positions. In the flat stowed position, the hinge means are located within cavity portions of the side rail means of the rack so as to be concealed and give the rack an appearance of being only a luggage rack. The arrangement is such that the side rail means are utilized as side rails for luggage and as tiltable support rails for ski clamping means which comprise a removable upper clamping bar means mounted on the cross rail means which also serve as lower support bar means of the clamping means. The upper clamping bar means is pivotally and removably mounted on the combination crossrail means and lower support bar means while being latchably engageable therewith and lockable relative thereto. The upper clamping bar means is pivotally movable between a lowered closed ski clamping position and a raised inclined open ski receiving and removing position. Removable parts of the ski clamping means are arranged to be concealed and inaccessible in the clamping position. The combination crossrail means and lower support bar means have a curved upper surface to support the bottom surfaces of skis which are resiliently compressibly held thereon by a compressible rubberlike ski gripping means carried by the upper clamping bar means.

BRIEF DESCRIPTION OF THE DRAWINGS

FIG. 1 is a perspective view of a combination ski rack and luggage rack mounted on the rear trunk lid of an automobile and located in a lowered position;

FIG. 2 is another perspective view of the apparatus of FIG. 1 located in a raised position;

FIG. 3 is a cross-sectional view of a portion of the apparatus of FIG. 1 taken along the line 3—3;

FIG. 4 is another cross-sectional view of a portion of the apparatus of FIG. 1 taken along the line 4—4 of FIG. 3;

FIG. 5 is a side elevational view of another portion of the apparatus of FIG. 1 taken in the direction of the arrow 5;

FIG. 6 is a cross-sectional view of the apparatus shown in FIG. 5;

FIG. 7 is a cross-sectional view of a portion of the apparatus shown in FIG. 5 taken along the line 7—7 in FIG. 6;

FIG. 8 is another cross-sectional view of another portion of the apparatus shown in FIG. 5 taken along the line 8—8 in FIG. 6;

FIG. 9 is still another cross-sectional view of another portion of the apparatus shown in FIG. 5 taken along the line 9—9 in FIG. 6; and FIG. 10 is a final cross-sectional view of another portion of the apparatus shown in FIG. 5 taken along the line 10—10 in FIG. 6.

IN GENERAL

Referring to FIGS. 1 and 2, a combination ski and luggage rack 10 is shown to comprise spaced parallel extending side rail means 12, 14 each of which is movably attached to the trunk lid 16 of a vehicle 18 by hinge means 20, 21 so that the rack is movable between a stowed flat luggage carrying position close to the trunk lid, as shown in FIG. 1, and a raised ski carrying position upwardly forwardly inclined relative to the trunk lid, as shown in FIG. 2. Ski clamping means 22, 23 extend between the side rail means 12, 14 in spaced parallel relationship above the trunk lid.

THE HINGE MEANS

Referring now to FIGS. 3 and 4, the front hinge means 20 is shown to comprise a fixed base plate portion 30 attached to the trunk lid by suitable fastening means 32, 34 and a movable base plate extension portion 36 hinged to the front end of the fixed base plate portion, as indicated at 38, for pivotal movement between an extended position shown in FIG. 4 and an overlapping position, shown in FIG. 1, relative to the fixed base plate portion. The hinge means further comprises a rail lifting portion in the form of a pair of members 40, 42 hinged to opposite ends of the movable base plate portion and fixed base plate portion, respectively, at 44, 46 and to each other at 48 for pivotal movement between a flat stowed lowered position, as shown in FIG. 4, and a raised inclined lifting position as shown in FIG. 2. Holding means, in the form of a threaded pin means 50 mounted in an alignable hole 52 (FIG. 4) of plate portion 36 and nut type fastening means 54, are provided to secure the hinge means in the raised inclined position as shown in FIG. 2. In the flat stowed position, FIG. 4, the holding means further comprises additional holding means in the form of alignable holes 56, 58, in the lifting member and in the side rail means, respectively. The rear hinge means comprises a base portion 60 fixedly secured to the trunk lid by suitable fastening means 62 and an upwardly extending pin housing portion 64.

RAIL MEANS

Each of the side rail means comprises an elongated base rail member 70, 71 having a channel-shaped cross section providing a hinge cavity 72 in which the hinge means are hiddenly received in the flat stowed position. Each channel-shaped base rail member is pivotally mounted on the front hinge means at 48 and on the rear hinge means at 74 by suitable pin means extending through the side walls 76, 78 of the base rail member. The arrangement is such that the base rail member is supported on the top of hinge means 48 and pin housing 64 in the flat stowed position with fastener bolt 50 extending through aligned holes 56, 58 and nut 54 threaded on to the protruding end portion of the bolt into fastening engagement with the adjacent upper surface of the base rail member at 80.

Each of the side rail means further comprises upwardly extending die cast stanchion members 82, 84 fixedly mounted on opposite ends of the base rail members 70, 71 by suitable fastening means. Elongated upper side rail members 86, 87 are fixedly supported at opposite ends within a corresponding shaped cavity in the stanchion members by suitable fastening means. The rail means further comprise crossrail members 88, 90 which are fixedly mounted on the stanchion members in any suitable manner. The rail means 86, 87, 88, 90 define an enclosed luggage carrying space above the trunk lid which may be provided with suitable support ribs (not shown).

SKI CLAMPING MEANS

Referring now to FIGS. 5–10, each of the ski clamping means 22, 23 is shown to comprise lower support bar means, in the form of cross rail members 88, 90, which are of hollow tubular form and have a somewhat pear-shaped cross-sectional configuration, as shown in FIG. 9. Opposite sides of the lower support bar means are provided with curved surfaces 92, 94 of large and small radii, respectively, connected by tangential surfaces 96, 98. The lower support bar means is mounted with both the upper surface 96 and the lower surface 98 inclined relative to horizontal so as to matingly receive corresponding shaped crossbar connecting means 100, 102 each of which comprises a separable and removable clamp member 104 having a large radius clamping flange 106 and a separable and removable clamp member 108 having a small radius clamping flange 110. Clamp member 108 has an inclined abutment surface 112 arranged to be seated on the upper surface 113 of support bar 90 and a horizontal abutment surface 114 forming a seat for clamp member 104. The body portions of the clamp members are fixedly secured together and relative to the support bar 90 by suitable alignment pin and fastening means, 116, 117 and 118, 119, extending between and through flange portions 120, 121, 122, 123, respectively. The flange portions terminate in hook means 124, 126 providing pin seat means and keeper means for purposes to be hereinafter described.

Referring now to FIGS. 6–10, the ski clamping means further comprises front and rear pivotally mounted, latchable, lockable, and removable upper clamping bar means 130, 131, each of which comprises housing means in the form of stanchion members 132, 134 and a central clamping bar member 136 extending therebetween and supported thereby on projections 138, 140 by suitable fastening means 142. The stanchion members are hollow die cast parts which differ from each other in the provision of latck-lock part cavities in stanchion member 132 and pivot part cavities in stanchion member 134. The upper clamping bar means is pivotally mounted at one end by pivotal support means in the form of pivot pin means 144 within a cavity 146 between flange portions 148, 150 of stanchion member 134 and carried thereby. The pivotal support means further comprises pin seat means provided by a curved seat 152 on the bottom of hook means 126 whereby the upper clamping bar means is pivotally movable from a closed ski clamping position, FIG. 6, extending parallel to and adjacent the lower support bar means, to an open outwardly spaced ski receiving position (not shown) in spaced relationship to the lower support bar means.

Latch means are provided in a cavity 156 in the stanchion member 132 opposite the pivotal mounting stanchion 134 and comprise a latch member 158 pivotally supported by a pin 159 extending between opposite stanchion walls 160, 161, FIG. 10. The open side of the cavity 156 facing the ski receiving slot between the upper clamping bar means and the lower support bar means is closed by the side surface of the latch member. One end 162 of the latch member is engaged by spring means 164 which bias the latch member toward a latched position with a hook portion 166 engaged with keeper means provided by hook portion 124. An abutment surface 168 locates the latch member within the latch cavity. An integral hand manipulatable latch actuating lever 172 protrudes beyond the stanchion member 132 through an opening 174 to permit the latch to be manually released by depressing the lever. Locking means 176 may also be provided in a suitable lock cylinder cavity 178 in stanchion member 132 to move a surface 180 between locking and unlocking positions relative to the latch member. The arrangement of the latch and pivotal connection is such that the entire ski-holding upper clamping bar means may be removed from association with the lower support bar means 88, 90 and connecting means 100, 102 by releasing the latch 158, upwardly pivoting the upper clamping bar means to clear hook portion 124, and then disengaging the pin 144 from surface 152 of hook portion 126 by downward movement of the pin into alignment with slot 182 followed by sliding transverse movement of the pin through slot 182. When the upper clamping bar means has been removed, the connecting means 100, 102 may also be removed from the lower support bar means 90 by removal of the threaded fastening means 118, 119 so as to provide a four sided luggage rack.

The upper clamping bar means further comprises resilient flexible compressible ski gripping means 184, in the form of an elongated tubular member of molded or extruded rubberlike material, carried by the clamping bar member 136. As shown in FIG. 8, the upper edge of the gripping means is provided with a solid bead 186 of generally triangular cross-sectional configuration which is slidably received in and held by a correspondingly shaped slot 188 extending across the bottom of the clamping bar member. Flexible, outwardly inclined gripping finger portions 190, 192 are integrally formed along the bottom edge of the gripping means to resiliently deflectably engage and frictionally engage and hold the top surfaces of skis therebeneath. The body portion of the gripping means comprises three cavities 194, 196, 198 which facilitate resilient upward deflection and compression of the entire gripping means as well as outward deflection of the flange portions 190, 192. In this manner, the ski bottoms may be supported by engagement in substantially line contact with the upper portion of curved surface 92 of crossbar 90 at 200.

Since it is contemplated that the inventive concepts may be variously otherwise embodied, it is intended that the appended claims be construed to include alternative embodiments of the invention except insofar as limited by the prior art.

I claim:

1. Rack apparatus adapted to be carried by a vehicle comprising:
   hinge means adapted to be fixedly attached to the vehicle and being movable between a flat stowed position and a raised inclined lifting position,
   rails means attached to said hinge means and defining a luggage carrying space in the flat stowed luggage carrying position and being movable on said hinge means between the flat stowed luggage carrying position and an inclined raised ski carrying position, and
   ski-clamping means attached to and carried by said rail means and defining an inclined ski carrying space in the inclined raised ski carrying position.

2. The apparatus as defined in claim 1 and wherein said hinge means comprises:
   a base plate portion fixedly mountable on the vehicle,
   a rail lifting portion pivotally supported at one end on the base plate portion and at the other end on said rail means, and said rail lifting portion being movable between a lowered stowed position and a raised lifting position.

3. The invention as defined in claim 2 and wherein said hinge means further comprises:
   a base plate extension portion pivotally connected to one end of said base plate portion and being pivotally movable between an extended position located beyond the one end of said base plate portion and an overlapping position located in parallel relationship above said base plate portion, and said rail lifting portion being pivotally connected at the one end to said base plate extension portion and being located in overlapping relationship thereto in the lowered stowed position.

4. The invention as defined in claim 3 and wherein said rail lifting portion comprises:
   a pair of members pivotally connected to each other at one end and the rail means at the other end, the other end of one of said members being pivotally connected to said base plate extension portion and the other end of the other of said members being pivotally connected to the end of said base plate portion opposite said base plate extension portion whereby movement of the base plate extension portion between the extending position and the overlapping position causes movement of the pair of members between a flat lowered position, overlapping the base plate portion and the base plate extension portion, and the raised bridging position.

5. The invention as defined in claim 4 and wherein holding means are associated with said hinge means to hold said hinge means in the raised lifting position.

6. The invention as defined in claim 5 and wherein there being additional holding means associated with said hinge means and said rail means to hold said hinge means and said rail means in the stowed lowered position.

7. The invention as defined in claim 6 and said holding means comprising:
   pin means fastened to and extending upwardly from said base plate portion,
   said base plate extension portion having aperture means located to receive said pin means in the raised lifting position of said hinge means with said base plate extending portion located in overlapping relationship to said base plate portion, said rail means having aperture means located to receive said pin means in the flat lowered position of said rail means, and fastening means engageable with said pin means in the raised bridging position of said hinge means and said rail means and in the flat lowered position of said hinge means and said rail means to secure the rack apparatus in each position.

8. The invention as defined in claim 1 and wherein said rail means having hinge cavity means receiving said hinge means in the flat lowered position and hiding said hinge means within said rail means.

9. The invention as defined in claim 1 and wherein said ski clamping means being removably attached to said rail means.

10. The invention as defined in claim 1 and wherein said rail means comprising a pair of spaced side rail members and a pair of spaced crossrail members fixedly secured together for movement as a unit between the flat lowered position and the raised inclined position, and defining a luggage carrying space therebetween in the flat lowered position.

11. The invention as defined in claim 10 and wherein said crossrail members provide lower support bar means for said ski-clamping means having an upper surface for supporting skis.

12. The invention as defined in claim 11 and wherein said lower support bar means have a rounded upper surface providing substantially line contact with skis supported thereon.

13. The invention as defined in claim 12 and each of said ski-clamping means further comprising an upper cross bar assembly pivotally movable relative to said lower support bar means and having resilient flexible compressible gripping means aligned with said lower support bar means to grip and hold skis supported thereon.

14. The invention as defined in claim 13 and said gripping means having a compressible body portion and spaced outwardly inclined gripping finger portions extending from the body portion toward said lower support bar means.

15. The invention as defined in claim 10 and said ski-clamping means comprising:

lower support bar means provided by said cross rail members, upper clamping bar means extending in overlapping relationship above said lower support bar means, pivotal support means at one end of said upper clamping bar means pivotally mounting said upper clamping bar means relative to said lower support bar means for pivotal movement between a closed clamping position in overlapping relationship to the lower support bar means and an open outwardly spaced ski receiving position in spaced relationship to the lower support bar means, and latch means at the opposite end of said upper clamping bar means to releasably latch the upper clamping bar means in the closed clamping position.

16. The invention as defined in claim 15 and wherein said pivotal support means comprises:

pin means carried by said upper clamping bar means, and pin seat means carried by said lower support bar means.

17. The invention as defined in claim 16 and wherein said latch means comprises:

a latch member carried by said upper clamping bar means, and keeper means carried by said lower support bar means.

18. The invention as defined in claim 17 and wherein said upper clamping bar means comprises:

a central clamping bar member, housing means supporting opposite ends of said central clamping bar member, said latch means and said pivotal support means being mounted completely within said housing means in the closed clamping position.

19. The invention as defined in claim 18 and having connecting means between said lower support bar means and said pin seat means and said keeper means comprising:

separable and removable clamp members having a base portion, each clamp member having clamping flange means extending downwardly from said base portion and defining a clamping cavity having a cross-sectional configuration similar to said lower support bar means and clampingly receiving said lower support bar means therewithin, each clamp member further having upwardly support flange means extending upwardly from said base portion, removable fastening means associated with said clamping members to secure said clamping members in fixedly mounted clamping engagement with said lower support bar means, said housing means receiving said flange means and said removable fastening means in the lowered closed clamping position and preventing removal of said fastening means so as to prevent theft of skis.

20. The invention as defined in claim 19 and said lower support bar means and said clamping cavity having corresponding pear-shaped cross-sectional configurations, said lower support bar means being tilted so as to receive and hold said keeper means and said pin seat means in a vertical attitude.

21. The invention as defined in claim 19 and having lock means associated with said latch means to lock said upper clamping bar means in the lowered closed clamping position.

22. The invention as defined in claim 19 and said pin support means comprising:

hook means having a pin slot opening inwardly toward the ski carrying area between said lower support bar means and said upper clamping bar means, a rounded pin seat at the end of said slot, and said pin means being movable through said slot to and from engagement with said pin seat means to permit disassociation of the upper clamping bar means from the lower support bar means.

23. The invention as defined in claim 22 and said keeper means comprising:

keeper hook means having a latch slot opening inwardly toward the ski carrying area between said upper clamping bar means and said lower support bar means, said latch means being movable through said latch slot to and from engagement with said keeper hook means to latch and release said upper clamping bar means relative to said lower support bar means.

24. The invention as defined in claim 23 and said latch means comprising:

a vertically extending body portion centrally pivotally mounted in said housing, a latch hook at the lower end of said body portion and being engageable with said keeper hook means, spring means in said housing engaging the upper end of said body portion and biasing said latch hook toward engagement with said keeper hook means, and release lever means extending from said body portion through said housing for manual manipulation to release said latch hook from engagement with said keeper hook means to permit movement of the upper clamping bar means to the open position.